Dec. 28, 1954  F. C. CARROLL  2,698,216
WEIGHING SCALE PRINTING DEVICE
Filed June 2, 1952  3 Sheets-Sheet 1
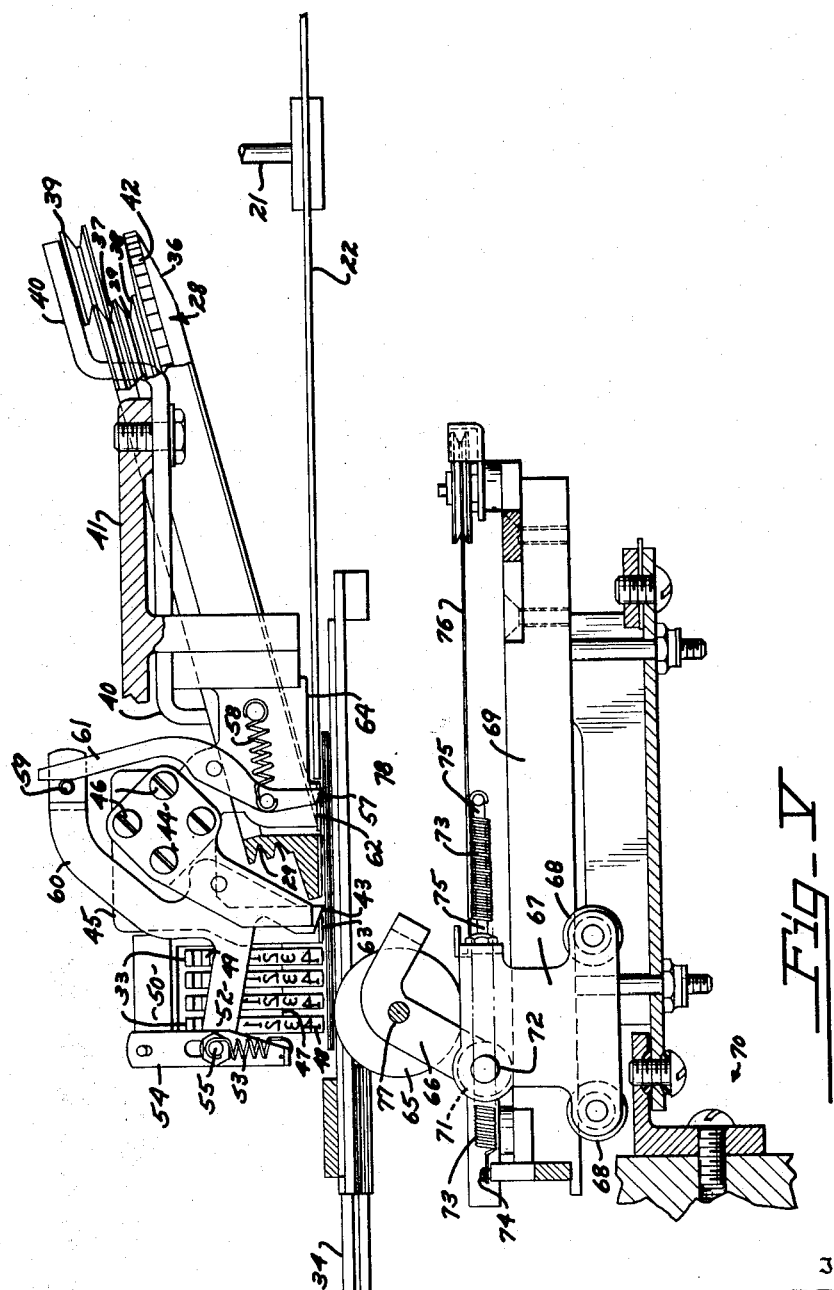
Fig. V
Inventor
FREDERICK C. CARROLL
By
Marshall, Marshall & Heating
Attorneys Dec. 28, 1954   F. C. CARROLL   2,698,216
WEIGHING SCALE PRINTING DEVICE
Filed June 2, 1952   3 Sheets-Sheet 2
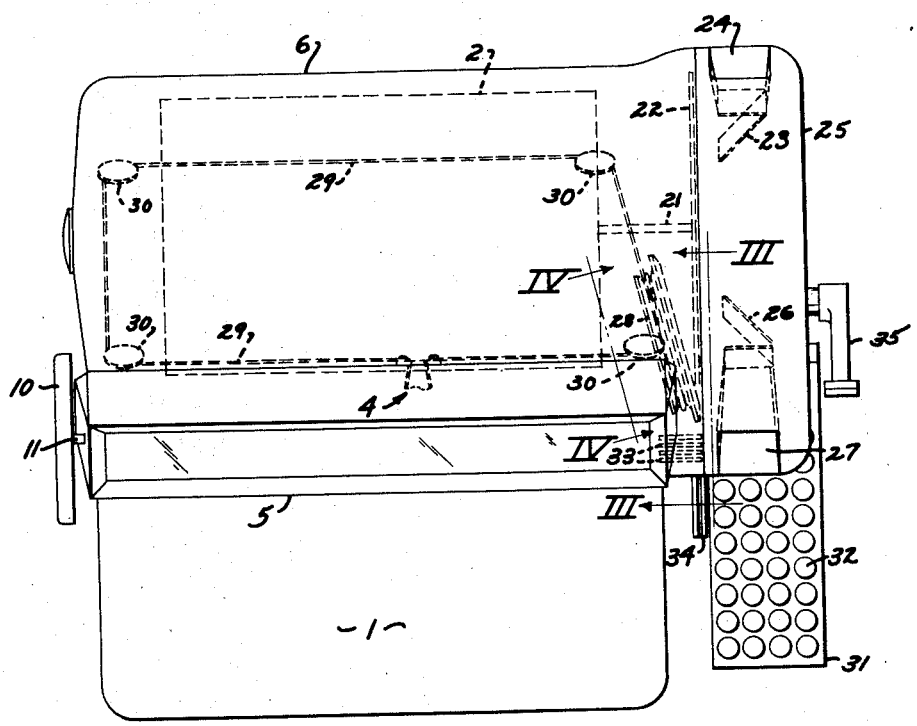
Fig. I
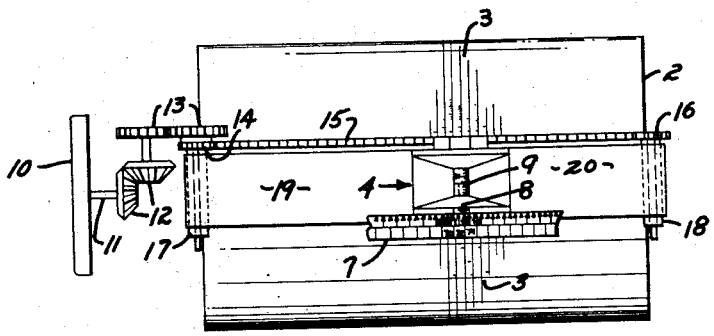
Fig. II
Inventor
FREDERICK C. CARROLL Dec. 28, 1954 F. C. CARROLL 2,698,216
WEIGHING SCALE PRINTING DEVICE
Filed June 2, 1952 3 Sheets-Sheet 3
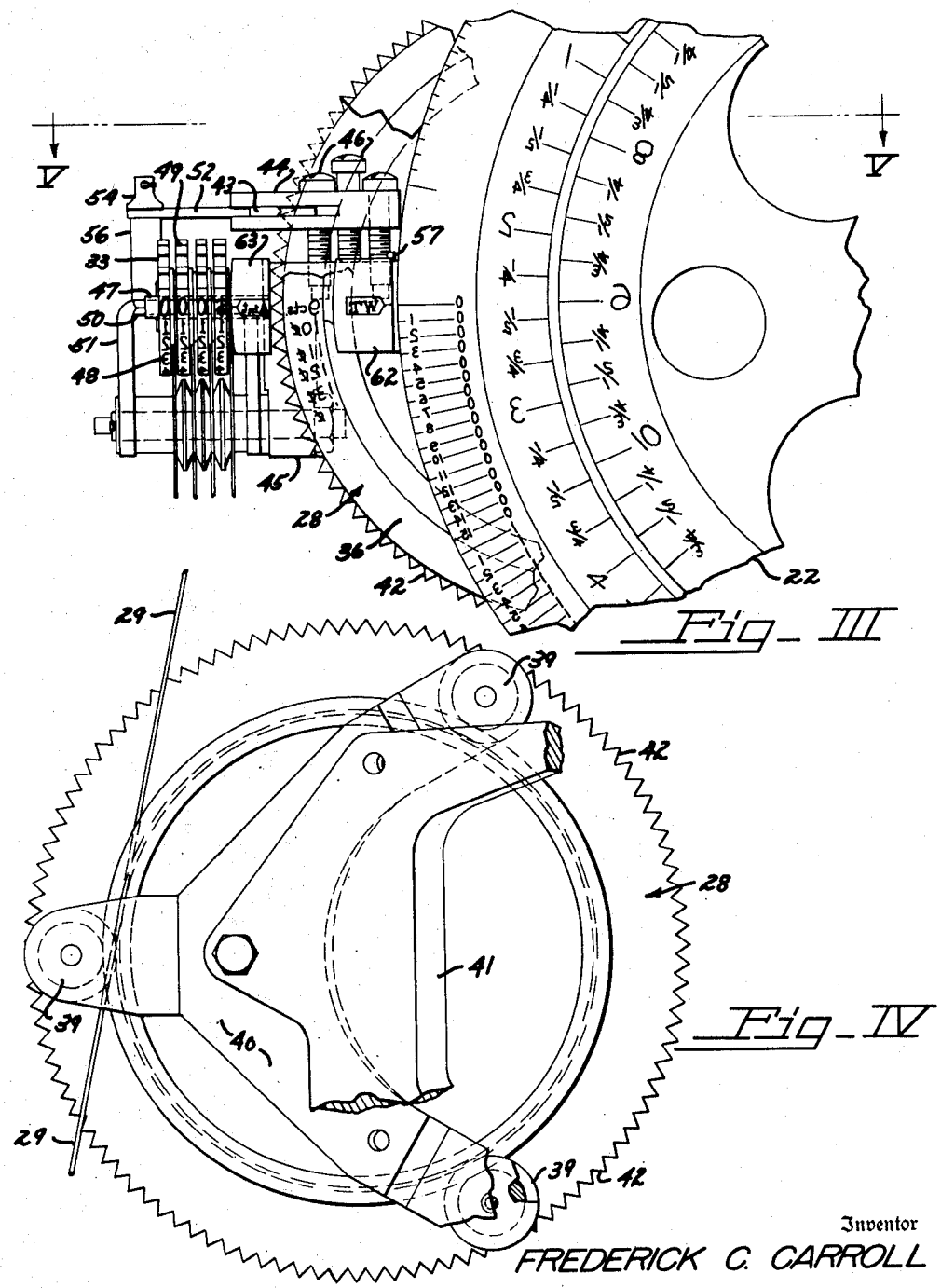
Fig. III
Fig. IV
Inventor
FREDERICK C. CARROLL
By
Marshall, Marshall & Fusting
Attorneys

United States Patent Office 2,698,216
Patented Dec. 28, 1954

2,698,216

WEIGHING SCALE PRINTING DEVICE

Frederick C. Carroll, Toledo, Ohio, assignor to Toledo Scale Company, Toledo, Ohio, a corporation of New Jersey Application June 2, 1952, Serial No. 291,198

15 Claims. (Cl. 346—10)

This invention relates to weighing scales equipped to print a ticket showing the weight, price and value of a commodity being weighed, and in particular to an improved price printing attachment for such a scale.

It has often been proposed that weighing scales for retail food stores be equipped to compute automatically the value of a commodity being weighed and print a ticket showing its weight, price, and value. While the need for such a scale has well been recognized, no one has devised such a commercially acceptable weighing scale. Previously proposed devices have either been inaccurate or too expensive to the prospective users of the scales to compete with computed value scales—scales that display on a chart the weight of the commodity and the value as computed at a number of selected prices.

The principal object of this invention is to provide a computed value weighing scale with printing mechanism and a movable viewing device that is positionable according to the price of the commodity and which viewing device is operatively connected to a price printing member arranged to position price printing type in juxtaposition to weight printing type and value printing type.

Another object of the invention is to accomplish the printing of weight, price and value indications in a simple, efficient, and inexpensive manner.

Other objects and advantages will be apparent from the following description in which reference is had to the accompanying drawings illustrating a preferred form of the invention.

According to the invention, a weighing scale having means for displaying to an operator value indicia corresponding to the weight of the commodity on the scale computed at a selected price is provided with a weight printing chart operable by the scale mechanism and a value printing mechanism that is positionable by the operator in accordance with the observed computed value indicia. A movable viewing device, settable according to the price of the commodity, is arranged to direct the operator's attention to the selected column of value indicia and simultaneously position a price printing member in order that the price of the commodity will be printed on a ticket simultaneously with the weight and the computed value. The automatic weight type positioning mechanism, the automatically operated price printing mechanism, and the key operated value type positioning mechanism are so constructed and co-ordinated that the operator, upon noting the value of the commodity from the chart rotated by the scale, can enter such value on the keyboard and print the weight-price-value ticket thereby obtaining a permanent record of the transaction.

In the drawings:

Figure I is a plan view of a weighing scale equipped with the price printing device.

Figure II is a schematic diagram of the driving mechanism for positioning a viewing device to co-operate with a column of computed value indicia corresponding to a selected price.

Figure III is an enlarged fragmentary elevational view taken substantially along the line III—III of Figure I, parts being broken away.

Figure IV is a fragmentary elevational view on an enlarged scale taken substantially along the line IV—IV of Figure I, parts being broken away and parts shown in section.

Figure V is a sectional view taken substantially along the line V—V of Figure III showing a preferred type of printing mechanism to be employed with the instant invention.

These specific figures and other disclosure are intended merely to illustrate the invention but not to impose limitations upon its scope.

A weighing scale equipped to print weight, price, and value tickets according to the invention comprises a base (not shown) in which is mounted a lever system (not shown) to support a load receiver or platter 1. Conventional load counterbalancing mechanism, erected from the base, is operatively connected to the lever system supporting the platter 1 and is drivingly connected to a rotatable cylindrical chart 2. The chart 2 has a plurality of columns 3 of indicia representing the value or cost of a commodity on the platter computed according to various prices, there being one column for each price. The value indicia are displayed to an operator through a viewing device 4 slidably mounted within a tiltable housing 5 pivotally mounted on the upward forward portion of a scale housing 6. A price chart 7 (Figure II) mounted within the tiltable housing 5 co-operates with an index 8 on the viewing device 4 to identify that one of the columns 3 of value indicia that is located behind an opening 9 of the viewing device 4. The viewing device 4 is traversed along the cylindrical chart 2 by manipulation of a hand wheel 10 carried on a shaft 11 extending from the end of the tiltable housing 5.

The drive from the hand wheel 10 to the viewing device 4 includes a pair of bevel gears 12 and a pair of spur gears 13 that transmit power to a sprocket 14 driving a ladder chain 15 attached to the viewing device 4. The chain is also carried over a sprocket 16 at the other end of the housing 5. The sprockets 14 and 16 drive spools 17 and 18 upon which curtains 19 and 20 are rolled. The curtains extend from the viewing device 4 and serve to conceal those portions of the rotatable chart 2 that are not hidden by the viewing device 4.

The chart 2 is carried on a chart shaft 21 which also carries a disk chart 22 provided with weight indicia. Images of the weight indicia on the chart 22 as reflected by a mirror 23 are visible from the customer's side of the scale through a window 24 formed in a housing 25 covering the right end of the scale. Images of other weight graduations, as formed by a second mirror 26, are visible from the operator's side of the scale through a second window 27.

The disk chart 22 also carries raised weight printing graduations and type around its periphery and positions such weight printing graduations and type in proper printing position according to the load on the scale.

An annular price printing ring 28 carrying price printing type is operatively connected through a cord drive 29, trained over a plurality of pulleys 30, to the viewing device 4 so that the price printing ring 28 is automatically positioned as the viewing device 4 is moved to a position corresponding to the selected price.

A keyboard mechanism 31 having a plurality of keys 32 is mounted from the base laterally adjacent the platter 1 and forward of the lower portion of the housing 25. The keyboard mechanism 31 is operatively connected to value printing type bearing wheels 33 so that an operator, having placed a commodity on the platter 1 and positioned the viewing device 4 according to the commodity price, may observe the computed value of the commodity displayed in the viewing device 4 and enter such value amount on the keyboard 31. Then, having placed a ticket in a ticket guide 34, the operator pushes a handle 35 that is connected through auxiliary mechanism to move the ticket into printing position and to print thereon the value of the commodity as entered on the keyboard 31, the price as indicated by the position of the viewing device 4, and the weight of the commodity as indicated by the position of the disk chart 22.

The price printing ring 28 is formed with a beveled face 36 carrying raised price printing type and, behind that face and at a smaller diameter, a pair of peripheral grooves 37 and 38, (shown best in Figure V), that receive the drive cord 29 connected to the viewing device 4. One end of the drive cord 29 is trained and attached in the groove 37 and the other end is trained and attached in the groove 38.

The price printing ring 28 is supported on a plurality of grooved rollers 39 carried to be rotatable on arms of a bracket 40 attached to an end frame 41 of the weighing scale mechanism. The grooved rollers 39 engage a shoulder of the peripheral groove 37 of the ring 28 and, being equally spaced around its periphery, hold the ring 28 in position while permitting it to rotate according to the movement of the viewing device 4. The price printing ring 28 is located generally behind in overlapping relation to the edge of the weight chart 22 and at an angle to the plane of the chart 22 so that a portion of its beveled face projecting radially beyond the chart 22 is co-planar with the chart. This makes it possible to obtain juxtaposed printing type for price and weight in a very small space.

The price printing ring 28 has on its periphery a plurality of notches 42, one for each price to be printed, which co-operate with a centering finger 43 pivotally mounted in a holder 44 which in turn is adjustably mounted on a bracket 45 attached to or forming part of the end frame 41 of the scale. A plurality of screws 46 some of which are tapped into the holder 44 and some of which are tapped into the bracket 45 support the holder 44 and permit it to be adjusted with respect to the bracket 45 in order to properly align the price indicia in printing position.

Each of the value printing wheels 33, which are rotatably mounted on a shaft 47 projecting from the bracket 45, has a series of raised printing type 48 disposed along half the periphery of the drum and a plurality of notches 49 disposed along the other half of its periphery. A centering bar 50 carried on a U-shaped arm 51 co-operates with the notches 49 to align the value printing type during a printing operation.

Normally, the centering finger 43 for the price printing ring 28 and the centering bar 50 for the value printing wheels 33 are in inoperative or disengaged position. They are engaged during the first portion of the stroke of the manually operated handle 35 by auxiliary mechanism (not shown) operatively connected thereto.

The price ring centering finger 43 includes an arm 52 which is connected through a spring 53 and a slide link 54 to an extension 55 of a centering bar arm 56, so that the finger 43 is driven into centering position at the same time that the centering bar 50 engages in the notches 49 of the value printing wheels 33. The parts are proportioned so that the centering finger 43 is firmly seated in one of the corresponding notches 42 in the periphery of the price ring 28 and so that the spring 53 is slightly extended before the centering bar 50 is seated in the notches of and has centered the value printing wheels 33.

In order that the operation of the printing mechanism shall not disturb the indication of weight, a brake 57 pivoted on the bracket 45 is arranged to engage the edge of the disk chart 22 at the same time that the centering finger 43 and the centering bar 50 move into centering position. The brake 57 is urged by a tension spring 58 into braking position and is normally held out of braking engagement by a pin 57 mounted on a leg 60 of the centering finger 43 in position to engage a tail end 61 of the brake 57. As soon as the centering members move in response to movement of the operating handle 35, the brake 57 is applied to the rim of the chart 22 and the price printing ring 28 and the value printing wheels 33 are locked in printing position.

Raised portions 62 and 63 of the bracket 45 in the plane of the type bearing faces of the chart 22, price ring 28, and value wheels 33 carry raised indicia and index marks to print legends designating the amount impression, the weight impression, and an index against which the printed weight graduations are read. Another portion 64 of the bracket 45 extends directly behind the disk chart 22 and serves as a back-stop for the chart during a printing operation. The chart is installed so that it is close to but not in rubbing contact with the backstop and is made of sufficiently flexible material that it easily yields to the printing pressure until it is supported by the back-stop portion 64.

Referring to Figure V, a printing mechanism of the preferred type consists of a printing roller 65 mounted to be rotatable on a pair of L-shaped arms 66 which in turn are pivotally mounted on a printing carriage 67. The carriage 67 is equipped with a plurality of flanged rollers 68 to permit free movement of the carriage 67 along a short track 69 resiliently mounted on framework 70 within the housing 25 at the right end of the scale. An anti-friction bearing 71, such as a needle bearing, is carried on a shaft 72 (which also carries the L-shaped arms 66) and runs on the face of the track to support the printing roller 65 against the printing pressure without introducing friction.

A tension spring 73 connected between a pin 74 at the left end of the track as seen in Figure V and an extension 75 of the carriage 67 pulls the carriage 67 to its retracted position. During a printing operation, when tension is applied to a roller drive cable 76 through auxiliary mechanism operated by the handle 35, the carriage 67 moves along the track 69 thus extending the tension spring 73.

As the carriage 67 moves forward, a roller axle 77 is retained by a catch (not shown) until the roller pivots on the shaft 72 to straighten up substantially to provide printing pressure against a ticket held in the ticket guide 34. As long as the carriage 67 is moving forwardly, the printing pressure between the indicia and the roller, and the force to overcome the resiliency of the ticket and an inked ribbon 78 interposed between the ticket and the indicia hold the roller in its extended position, i. e., in position to apply pressure to the ticket. When the carriage starts its return, the roller 65 stops at its furthest advance and, by pivoting the arms 66 on the shaft 72, takes the position shown in Figure V, thus avoiding any pressure on the ticket during the return stroke, which, if there were movement of the ticket, would result in a double impression. The carriage 67 is returned to its retracted position by the spring 73.

By using a roller of fairly small diameter to apply the pressure successively to incremental areas of the ticket, it is possible to concentrate the available force so that the entire printing operation may be accomplished with little force. Thus, a five pound force applied by the roller 65 produces as satisfactory a print or impression as would several hundred pounds applied by a platen extending the full length of the ticket.

Operation

As a commodity is placed upon the platter 1, the load counterbalancing mechanism located within the scale housing 6 acts to rotate the cylindrical chart 2 and the disk chart 22 attached to the chart by means of the chart shaft 21. The chart 22 displays an indication of the weight of the commodity on the platter through the windows 24 and 27 to the customer and merchant respectively.

While the scale mechanism is coming to rest, the merchant traverses the viewing device 4 across the front of the scale until the index 8 aligns with the price on the price chart 7 at which the commodity sells. Positioning of the viewing device 4 rotates the price printing ring 28 by means of the cord drive 29, and the printing indicia on the ring 28 in printing position corresponds with the price on the chart 7 with which the index 8 is aligned.

The operator then reads the value of the commodity at the selected price through the opening 9 in the viewing device 4, and transfers the value reading to the keys 32 of the keyboard mechanism 31 to set up the printing type 48 on the value printing type wheels to print the value of the commodity.

A ticket is then placed in the ticket guide 34, and the handle 35 is pushed rearwardly to set in operation the printing of the ticket. Auxiliary mechanism places the ticket held in the ticket guide 34 in juxtaposition with the printing indicia. The printing roller 65 carried by the printing carriage 67 travels across the ticket, pressing the ticket against the printing type and the inked ribbon 78 interposed between the ticket and the indicia.

When the handle 35 is released, the printing carriage 67 moves to its retracted position, and the ticket may be removed. The ticket now has printed thereon an impression of the weight of the commodity, the price of the commodity and the commodity's value.

Various changes may be made in the details of construction and in the combination and arrangement of the several parts within the scope of the claims without departing from the spirit of the invention.

Having described the invention, I claim:

1. In a printing attachment for a weighing scale, in combination, a disk carried on an indicator shaft of the scale, printing type arranged on a face of the disk along the periphery thereof, a second member of annular form and having a conical face similar to the frustum of a shallow right cone, means for mounting the second member in overlapping relation to said disk with the slant height of the conical frustum generally tangent to the plane of said disk and radially adjacent the periphery of the disk, printing type on the conical face of the second member, and means for taking impressions from the type on said disk and member.

2. In a printing attachment for a weighing scale, in combination, a disk carried on an indicator shaft of the scale, printing type arranged on a front face of the disk along the periphery thereof, an abutment juxtaposed to the rear face of the disk at a printing location, an annular member, said annular member having a conical face, printing indicia on the conical face, means for rotatably mounting the annular member with said abutment extending therethrough and with the conical face tangent to the plane of said disk, said annular member partially overlapping said disk, means for rotating the annular member to present selected indicia in printing position, and means for taking impressions from the type on said disk and member.

3. In a printing attachment for a weighing scale, in combination, a disk carried on an indicator shaft, printing type arranged on a front face of the disk along the periphery thereof, a fixed member having a surface in the plane of the disk adjacent the periphery of the disk, a raised index on said member for printing an index mark, an annular member rotatably positioned to partially overlap said disk and to encircle said fixed member, said annular member lying in a plane that intersects the plane of the disk adjacent that side of the fixed member remote from the disk, said annular member having a conical surface tangent to the plane of the disk, printing type arranged on the conical face, said annular member having at least one peripheral groove, a cord engaged in said peripheral groove for driving the annular member, and a plurality of rollers engaging a rim of the groove for supporting the annular member.

4. In a printing attachment for a weighing scale, in combination, a disk carried on an indicator shaft, printing type arranged on a front face of the disk along the periphery thereof, a fixed member having a surface coplanar with the disk and adjacent the periphery of the disk, a raised index on said member for printing an index mark, an annular member rotatably positioned to encircle said fixed member, said annular member lying in a plane that intersects the plane of the disk, said annular member having a conical surface that is tangent to the plane of the disk, printing type arranged on the conical surface, said annular member having a plurality of notches in its periphery corresponding in spacing to the indicia on the conical surface, means for engaging the notches for aligning the annular member, and means operable in the plane of the disk for taking an impression of the raised index and the type on the disk and annular member.

5. A printing device according to claim 4 in which the annular member is operatively connected to a manually settable indicia viewing device of the scale and the indicia on the annular member corresponds to the position of the viewing device.

6. In a printing attachment for a weighing scale, in combination, a disk carried on an indicator shaft of the scale, printing type arranged on a face of the disk along the periphery thereof, a member having a conical face similar to the frustum of a shallow right cone, means for mounting the second member in overlapping relation to said disk with the slant height of the conical frustum generally tangent to the plane of said disk and radially adjacent the periphery of said disk, printing type on the conical face of the second member, and means for taking impressions from the type on said disk and member.

7. In a printing attachment for a weighing scale, in combination, a disk carried on an indicator shaft of the scale, printing type arranged on a front face of the disk along the periphery thereof, an abutment juxtaposed to the rear face of the disk at a printing location, a member having a conical face, printing indicia on the conical face of said member, means for rotatably mounting the member with its conical face tangent to the plane of said disk, said member partially overlapping said disk, means for rotating said member to present selected indicia in printing position, and means for taking impressions from the type on said disk and member.

8. A printing device according to claim 7 in which the member is operatively connected to a manually settable indicia viewing device of the scale and the indicia on the member corresponds to the position of the viewing device.

9. In a printing attachment for a weighing scale, in combination, a disk carried on an indicator shaft, printing type arranged on a front face of the disk along the periphery thereof, a fixed member having a surface in the plane of the disk adjacent the periphery of the disk, a raised index on said member for printing an index mark, an annular member rotatably positioned to partially overlap said disk and to encircle said fixed member, said annular member lying in a plane that intersects the plane of the disk adjacent that side of the fixed member remote from the disk, said annular member having a conical surface tangent to the plane of the disk, printing type arranged on the conical face, a manually settable viewing device on the scale, and means operatively connecting the annular member to the viewing device.

10. In a printing attachment for a weighing scale, in combination, a disk carried on an indicator shaft, printing type arranged on a front face of the disk along the periphery thereof, a fixed member having a surface in the plane of the disk adjacent the periphery of the disk, a raised index on said member for printing an index mark, a second member having a conical face similar to the frustum of a shallow right cone, said member with the conical face being rotatably positioned to partially overlap said disk, said second member lying in a plane that intersects the plane of the disk adjacent that side of the fixed member remote from the disk, said member having its conical surface tangent to the plane of the disk, printing type arranged on the conical face, said member having at least one peripheral groove, a cord engaged in the peripheral groove for driving the member, and a plurality of rollers engaging a rim of the groove for supporting the member.

11. A printing device according to claim 10 in which the member with the conical face is operatively connected by means of the cord to a manually settable viewing device of the scale and the indicia on the member corresponds to the position of the viewing device.

12. In a printing attachment for a weighing scale, in combination, a disk carried on an indicator shaft of the scale, printing type arranged on a front face of the disk along the periphery thereof, an abutment juxtaposed to the rear face of the disk at a printing location, an annular member, said annular member having a conical face, printing indicia on the conical face, means for rotatably mounting the annular member with said abutment extending therethrough and with the conical face tangent to the plane of said disk, said annular member partially overlapping said disk, a manually settable indicia viewing device, means operatively connecting the annular member to the viewing device, and means for taking impressions from the type on said disk and member.

13. In a printing attachment for a weighing scale, in combination, a disk carried on an indicator shaft, printing type arranged on a front face of the disk along the periphery thereof, a fixed member having a surface coplanar with the disk and adjacent the periphery of the disk, a raised index on said fixed member for printing an index mark, a rotatable member, said rotatable member lying in a plane that intersects the plane of the disk, said rotatable member having a conical surface that is tangent to the plane of the disk, printing type arranged on the conical surface, said rotatable member having a plurality of notches in its periphery corresponding in spacing to the indicia on the conical surface, means for engaging the notches for aligning the rotatable member, and means operable in the plane of the disk for taking an impression of the raised index and the type on the disk and rotatable member.

14. A printing device according to claim 13 in which the rotatable member is operatively connected to a manually settable viewing device of the scale and the indicia on the rotatable member corresponds to the position of the viewing device.

15. In a printing attachment for a weighing scale, in combination, a disk carried on an indicator shaft of the scale, printing type arranged on a face of the disk along the periphery thereof, a second member having at least a segment of generally annular form and having a conical face similar to the frustum of a shallow right cone, means for mounting the second member in overlapping relation to said disk with the slant height of the conical frustum generally tangent to the plane of said disk and radially adjacent the periphery of the disk, printing type on the conical face of the second member, and means for taking impressions from the type on said disk and member.

References Cited in the file of this patent

UNITED STATES PATENTS

| Number | Name | Date |
|---|---|---|
| 437,959 | Wynn | Oct. 7, 1890 |
| 665,584 | Sears | Jan. 8, 1901 |
| 761,438 | Barr | May 31, 1904 |
| 2,053,433 | Hochreim | Sept. 8, 1936 |
| 2,111,128 | Rast | Mar. 15, 1938 |
| 2,149,478 | Triner | Mar. 7, 1939 |
| 2,288,761 | Williams | July 7, 1942 |